United States Patent

Kleinwachter et al.

[15] 3,638,536
[45] Feb. 1, 1972

[54] DEVICE WITH A PRESSURIZABLE VARIABLE CAPACITY CHAMBER FOR TRANSFORMING A FLUID PRESSURE INTO A MOTION

[72] Inventors: Hans Kleinwachter, 105, Kreuzstrasse, 785 Lorrach; Jens Geerk, Lorrach, both of Germany

[73] Assignee: said Kleinwachter, by said Geerk

[22] Filed: July 14, 1970

[21] Appl. No.: 54,763

[30] Foreign Application Priority Data

July 23, 1969 Germany.....................P 19 37 402.8

[52] U.S. Cl..........................................92/92, 3/1.2, 73/410, 74/89, 74/99

[51] Int. Cl...........................................................F16j 3/00

[58] Field of Search.....................92/90, 91, 92, 93, 97, 34; 73/410, 418, 398; 3/1.2; 138/118, 132, 137, 119, 178, 177; 74/89, 99

[56] References Cited

UNITED STATES PATENTS

| 2,642,091 | 6/1953 | Morin | 92/92 |
| 2,609,177 | 9/1952 | Hughes | 92/34 |
| 3,162,795 | 12/1964 | Cherniak | 73/398 X |
| 3,401,607 | 9/1968 | Wortman | 92/44 X |

FOREIGN PATENTS OR APPLICATIONS

| 6,704,918 | 10/1967 | Netherlands | 92/92 |
| 65,034 | 1/1950 | Netherlands | 74/99 |

*Primary Examiner*—Edgar W. Geoghegan
*Assistant Examiner*—Leslie J. Payne
*Attorney*—Michael S. Striker

[57] ABSTRACT

A device for the transformation of a fluid pressure, that is to say of the pressure of a liquid, a vapor, or a gas, into a motion capable of performing mechanical work, which comprises a pressurizable variable capacity chamber. This chamber is wholly or partly formed by a bag-shaped diaphragm which is elastically stretchable in preferably only one direction and attached to at least two rigid relatively movable members.

8 Claims, 7 Drawing Figures

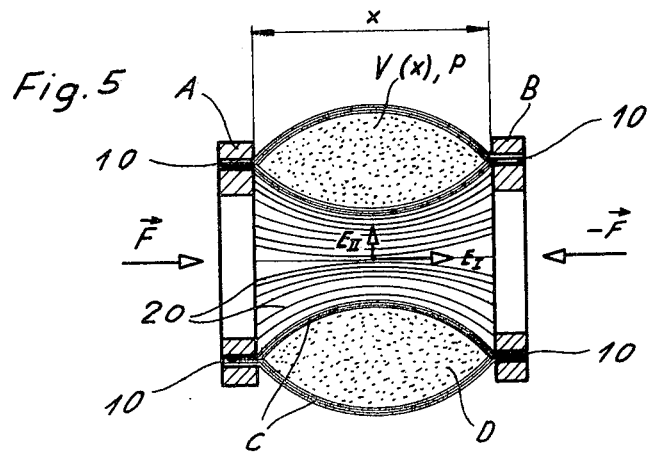
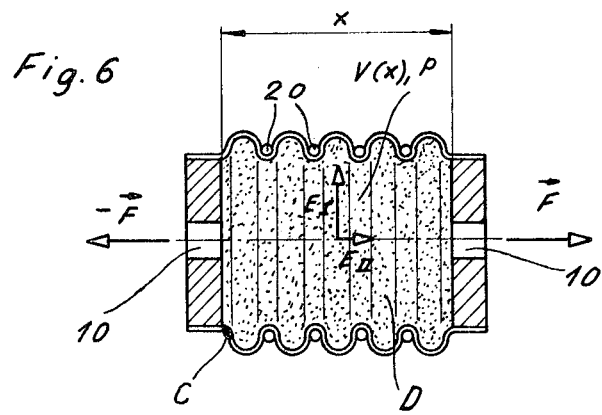
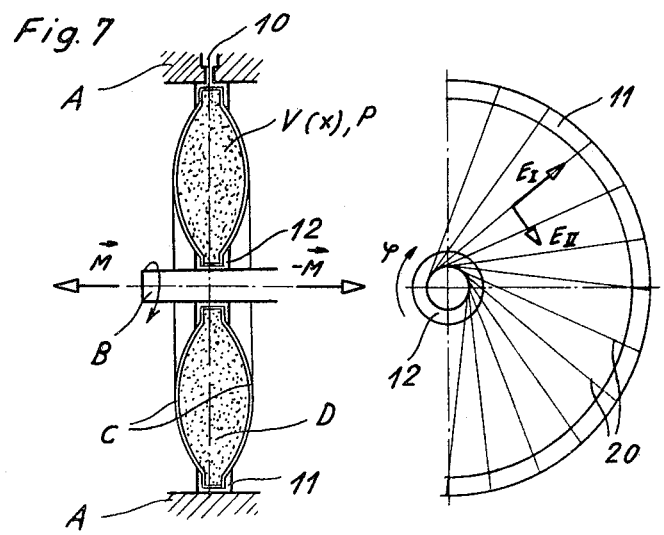

3,638,536

DEVICE WITH A PRESSURIZABLE VARIABLE CAPACITY CHAMBER FOR TRANSFORMING A FLUID PRESSURE INTO A MOTION

BACKGROUND OF THE INVENTION

This invention relates to a device for the transformation of a fluid pressure, that is to say of the pressure of a liquid, a vapor, or a gas, into a motion capable of performing mechanical work, comprising a pressurizable variable capacity chamber.

In hydraulic, pneumatic or steam engines of the displacement type, hereinafter referred to as fluid-driven engines, the static pressure of a fluid acting in a direction normal to the surface of a displaceable plunger or piston directly induces linear or rotary motion of the piston that can be made to perform mechanical work. The necessary seal between the moving piston and the stationary cylinder may be provided either by sliding elastic substances or by a rolling diaphragm. The sliding seal causes considerable frictional resistance.

The rolling diaphragm does not participate in the transmission of thrust to the working piston.

SUMMARY OF THE INVENTION

It is the object of the invention to provide a novel kind of fluid-driven engine of the displacement type which is free of the above shortcomings and which, by virtue of its likeness to the motor muscles of living animals, shall be referred to as a fluid-driven muscle.

To attain this object the present invention provides a device for the transformation of a fluid pressure into a motion capable of performing mechanical work, which comprises a pressurizable variable capacity chamber formed at least partly by a bag-shaped diaphragm which is elastically stretchable in preferably only one direction and attached to at least two rigid relatively movable members. The pressure fluid which is introduced into the variable capacity chamber elongates the diaphragm principally in the preferential direction, the elongation of the diaphragm causing at least one of the rigid members to move in relation to the other, so that its movement can be used for the performance of mechanical work.

In a preferred embodiment of this invention the diaphragm is provided with stiffening elements, preferably of filament form, that do not stretch and that thus prevent elongation of the diaphragm in the direction of their length. The stiffening elements may consist of wire and they may be incorporated in the diaphragm or provided adjacent its outside surface. In such a case the diaphragm itself may consist of an elastically elongatable material.

In a modified form of construction the diaphragm is a corrugated or folded bellows made of a material that does not stretch. Elongatability of the diaphragm is obtained by the folds of the bellows extending under pressure and recontracting when the pressure is relaxed or vacuum is applied.

It is desirable to provide at least one side of the bag or bellows with an elastic sealing material to permit the bag or bellows itself to junction as a stiffening element whereas the sealing function is performed by the elastic material, such as rubber.

An elongation instead of a contraction of the device can be achieved by providing a diaphragm substantially in tubular form between rigid members and embracing the tube with stiffening elements in the form of girth rings or a helix. The application of pressure will then always result in an axial extension of the girth rings or helix, expansion or distension in the radial direction of the tube being prevented by the stiffening elements that do not stretch. The diaphragm may be provided with corrugations that are extendable in the direction of elongation. Alternatively it may consist of an elastic material, provided the stiffening elements are sufficiently closely spaced.

A contraction under raised internal pressure, such as that observed to occur in human muscle can be achieved if the diaphragm forms a substantially tubular connection between two rigid members and the stiffening elements extend substantially in the axial direction of the diaphragm. The stiffening elements, which should be inextensible but flexible, permit the tubular diaphragm to distend radially in response to rising internal pressure, in which case the stiffening elements will pull the ends of the tube closer together. The rigid members attached to the ends will therefore likewise move towards each other when the pressure inside the tubular diaphragm is raised.

A torsional movement such as that required for instance for the rotation of an artificial arm can be generated by a diaphragm enclosing a substantially toroidal variable capacity chamber, said diaphragm being provided with stiffening elements extending obliquely across the radial direction, and the outside circumference of the diaphragm being attached to a fixed or movable rigid member, whereas its inside edge is attached to a correspondingly movable or fixed member. When the pressure inside the diaphragm is raised the driven part moves substantially coaxially about the fixed member through a given angle and is restored to its former position by the elasticity of the diaphragm or when suction is applied to the interior after the pressure has been relaxed.

BRIEF DESCRIPTION OF THE DRAWINGS

Several embodiments of a device according to the invention will now be described by way of example and with reference to the accompanying drawings, in which:

FIG. 5 is a longitudinal sectional view of a contracting fluid-driven muscle;

FIG. 6 is a longitudinal sectional view of an elongating fluid-driven muscle, and FIG. 7 is a cross-sectional view of a fragmentary plan view of a fluid-driven muscle for generating torque.

DESCRIPTION OF THE PREFERRED EMBODIMENTS

The device for transforming a liquid, vapor or gas pressure into a movement that is capable of doing mechanical work, herein referred to as a fluid-driven muscle, comprises two relatively movable rigid members A and B. These members correspond to the pistons and cylinders in conventional engines or to two bones connected by a joint. One or several diaphragms C stretch from one part A to the other part B to which they are attached.

The parts A and B together with the diaphragms C enclose a minimum capacity chamber D for the reception of a pressurizing fluid. In the embodiment according to FIGS. 1 and 5 this chamber D lies between two diaphragms C.

Figure 1:
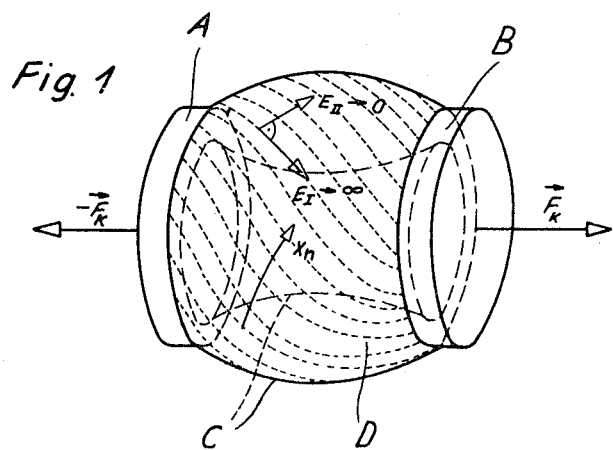
FIG. 1 is a perspective view of a fluid-driven muscle according to the invention.
Figure 2:
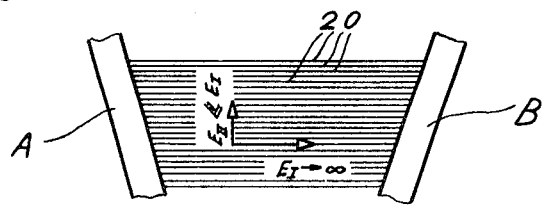
FIG. 2 is a fragmentary view of FIG. 1.

The diaphragms C have anisotropic elastic moduli. They are incapable of being elongated substantially in a particular direction I ($E_I \to \infty$), whereas they can be readily elongated in the direction II normal thereto ($E_{II} \to 0$). These relationships are indicated in FIGS. 1 and 2. A diaphragm C exhibiting anisotropic elastic properties is producible by embedding in a flexible diaphragm that can be elastically stretched in any direction a sheet of parallel flexible but inelastic filaments, as in FIG. 3, or by imparting the desired anisotropic elasticity to a flexible diaphragm that cannot as such be stretched by crimping, corrugating or crinkling the same. The crimped or corrugated diaphragm may then be embedded in an elastically stretchable material. FIG. 4 shows another diaphragm structure similar to the diaphragm structure of FIG. 3.

Figure 3:
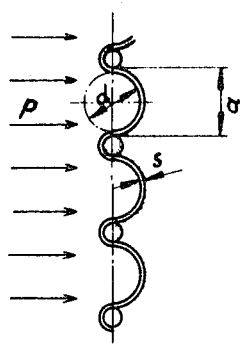
FIG. 3 is a part longitudinal sectional view of the diaphragm of the fluid-driven muscle according to FIG. 6.
Figure 4:
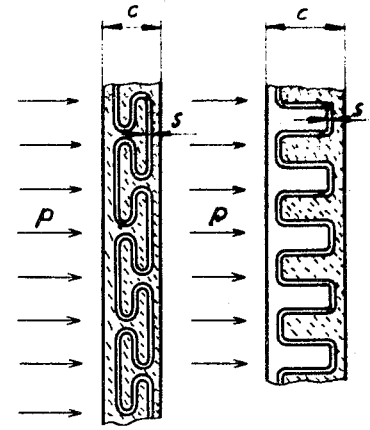
FIG. 4 is a fragmentary longitudinal sectional view of two more embodiments of diaphragms.

With reference to FIG. 3 it will be understood that when using flexible diaphragms that to not elastically stretch and contain an assembly of closely spaced unstretchable filaments, the maximum applicable fluid pressure $p$ will increase as the spacing $a$ of the filaments is reduced, according to the formula $$p_{max} = \frac{2\sigma_{adm} \cdot s}{a}$$

where $\sigma_{adm}$ is the admissible tensile stress and $s$ the thickness of the diaphragm. The following three types of fluid-driven muscle can be constructed by varying the direction of orientation of the sheet of inelastic filaments. This will be described with reference to FIGS. 5 to 7.

In FIG. 5 the rigid members A and B are rings between which two diaphragms C are suspended. The diaphragms C are attached to the two rings which contain openings 10 through which a fluid can be introduced into and abstracted from the chamber D formed between the two membranes C. When slack both diaphragms C substantially have the shape of coaxial tubes. They contain stiffening elements 20 in the shape of axial wires likewise secured to the members A and B. If a pressure fluid is forced through the openings 10 into the chamber D between the two diaphragms C, the latter will be distended in the radial direction, as indicated in FIG. 5. THe flexing of the diaphragms C involves a reduction of the distance between the ends of the diaphragms, and the two rigid members A and B are therefore drawn closer together in the direction of the two arrows F and −F. The increased pressure in the chamber D is thus accompanied by a contraction of the entire device which for this reason may be referred to as a contracting muscle. If one of the two rigid members, say member B, is prevented from moving, then the other member A will shift to and fro according to the degree of pressurization and the consequent volumetric capacity change of the chamber D, since the diaphragms C and their stiffening elements 20 tend to return to their slack original state when the pressure relaxes. In the conventional manner the movements of the member A can then be used to do mechanical work.

FIG. 6 is an element which expands in the direction of the arrow F and/or −F when the internal pressure rises and the volumetric capacity of the chamber D increases. The diaphragm C in this embodiment consists of a tubular bellows of inelastic flexible material. The diaphragm C is embraced by stiffening elements 20 in the form of wire rings which prevent the diaphragm C from being expanded in a direction normal to that of the arrows F and −F. The admission and abstraction of the pressure fluid is effected through openings 10 provided in disc-shaped rigid members A and B. The device according to FIG. 6 may be described as an elongating muscle of which there is no equivalent in nature.

FIG. 7 exemplifies another muscle that does not occur in nature, namely a torsion muscle. The diaphragm C when distended as shown in the left-hand half of FIG. 7, substantially has the shape of a doughnut or a toroid, generally resembling that of an inflated pneumatic tire. The rigid member A is assumed to be firmly anchored and ring shaped. It is provided with an opening 10 for introducing and abstracting a pressure fluid. The diaphragm C is attached by channel-section rings 11 and 12 to both the fixed member A and to a movable member B constituted by a shaft.

The right-hand side of FIG. 7 illustrates the disposition of the stiffening filaments 20 which extend obliquely across the radial direction from member B to member A. The stiffening elements 20 are attached to the rings 11 and 12 and by means of these rings to the members A and B.

When the chamber D enclosed between the diaphragms is filled with a pressure fluid the previously substantially parallel parts of the diaphragm C are distended and the stiffening elements 20 flex in a direction reducing the distance between their ends. FIG. 7 clearly shows that, on the assumption that the member A is fixed, the shaft portion B will be rotated as indicated by the arrow $p$. When the pressure is relaxed the diaphragms B and the stiffening elements 20 reassume their slack position of rest, the shaft B turning in the reserve direction.

The described device thus affords a means for directly transforming an expansion of volume into torque without requiring a sliding seal.

The element proposed by the invention is characterized by its simplicity and its low-power-weight ratio. Moreover, frictional losses are less than those experienced in conventional engines.

The invention may be embodied in other specific forms without departing from the spirit or essential characteristics thereof. The embodiments are therefore to be considered in all respects as illustrative and not restrictive.

We claim:

1. A device for the transformation of a fluid pressure into a motion capable of performing mechanical work, comprising a pressurizable variable capacity chamber formed at least partly by a bag-shaped diaphragm which is elastically stretchable in preferably only one direction and defining a substantially toroidal variable capacity chamber and being provided with stiffening elements extending obliquely across the radial direction, the diaphragm being attached at its outside periphery to a fixed or movable rigid member and at its inner edge to a correspondingly fixed or movable rigid member.

2. A device according to claim 1, wherein the diaphragm is provided with inelastic stiffening elements which prevent the diaphragm from elastically stretching in the lengthwise direction of these elements.

3. A device according to claim 1, wherein the diaphragm is a bellows made of an inelastic material.

4. A device according to claim 3, wherein at least one side of the bellows is provided with a sealing elastic material.

5. A device according to claim 2, wherein the diaphragm forms a substantially tubular connection between the rigid members and the stiffening elements embrace the diaphragm in the form of girth rings or helix.

6. A device according to claim 2, wherein the diaphragm forms a substantially tubular connection between the rigid members and the stiffening elements extend approximately in the axial direction of the tubular connection.

7. A device according to claim 6, wherein the substantially tubular connection contains substantially parallel axially disposed stiffening elements and defines an internal and a surrounding closed chamber which can be pressurized by the introduction thereinto of a fluid under pressure.

8. A device according to claim 1, wherein the inelastic stiffening elements are in the form of filaments.

* * * * *